US006745022B2

(12) United States Patent
Knox

(10) Patent No.: US 6,745,022 B2
(45) Date of Patent: Jun. 1, 2004

(54) MULTIPLE SERVICE PROVIDER PREPAID WIRELESS SERVICE CARD

(75) Inventor: David Knox, Vancouver (CA)

(73) Assignee: DataWave Systems, Inc., Vancouver (CA)

(*) Notice: Subject to any disclaimer, the term of this patent is extended or adjusted under 35 U.S.C. 154(b) by 0 days.

(21) Appl. No.: 10/122,052

(22) Filed: Apr. 12, 2002

(65) Prior Publication Data

US 2003/0194988 A1 Oct. 16, 2003

(51) Int. Cl.[7] .............................................. H04M 15/00
(52) U.S. Cl. ...................................... 455/406; 455/407
(58) Field of Search ................................ 455/406, 407, 455/408, 409, 550.1, 418, 419; 379/114.2, 127.01, 128, 111, 115.2, 127.3, 202.01, 221.01; 705/52, 16, 26

(56) References Cited

U.S. PATENT DOCUMENTS

| 5,621,787 | A | * | 4/1997 | McKoy et al. ......... 379/121.06 |
| 5,778,313 | A | * | 7/1998 | Fougnies ................... 455/406 |
| 5,854,975 | A | * | 12/1998 | Fougnies et al. ........... 455/408 |
| 6,000,608 | A | | 12/1999 | Dorf |
| 6,075,982 | A | | 6/2000 | Donovan et al. |
| 6,169,975 | B1 | | 1/2001 | White et al. |
| 6,208,851 | B1 | | 3/2001 | Hanson |
| 6,333,976 | B2 | | 12/2001 | Lesley |
| 6,381,315 | B1 | * | 4/2002 | Nhaissi ...................... 379/111 |
| 6,434,378 | B1 | * | 8/2002 | Fougnies ................... 455/406 |
| 6,581,827 | B2 | * | 6/2003 | Welton ...................... 235/380 |

* cited by examiner

Primary Examiner—Rexford Barnie
Assistant Examiner—Sheila Smith
(74) Attorney, Agent, or Firm—Michael J. DeLuca; Jon A. Gibbons; Fleit, Kain, Gibbons, Gutman, Bongini & Bianco P.L.

(57) ABSTRACT

A distributor of prepaid wireless services provides a prepaid card representing an amount of prepaid wireless service that may be applied to any of a plurality of wireless service providers. Prepaid cards applicable to any of several wireless service providers are sold at retail points of sale and activated at the time of purchase. The card is then registered with a universal host where the card owner enters the card account number, PIN and the wireless device telephone number for which the prepaid service is to be applied. The universal host automatically selects one of the plurality of service providers in response to the phone number. The purchased prepaid service is then enabled for the wireless device corresponding to the phone number.

17 Claims, 2 Drawing Sheets

MULTIPLE SERVICE PROVIDER PREPAID WIRELESS SERVICE CARD

PARTIAL WAIVER OF COPYRIGHT

Copyright, DataWave® Systems Inc., 2002 all rights reserved. A portion of the disclosure of this patent document contains material which is subject to copyright protection by the laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This invention generally relates to the field of prepaid wireless communication services.

BACKGROUND OF THE INVENTION

Prepaid wireless services such as prepaid cellular telephone service provide cellular telephone customers with a convenient method of budgeting their use of a cellular telephone. Instead of signing a long-term contract with a cellular service provider, after acquiring a cellular telephone the customer simply purchases a prepaid card at a retail point of sale for a desired amount of cellular telephone time or service. Upon purchasing, the cellular service provider enables the additional time or service associated with the customer's cellular telephone.

With the prepaid service, the customer need not provide personal information or be subject to a credit check in order to realize the advantage of cellular service. Furthermore, the customer will not be surprised by monthly bills because the service is prepaid. The cellular service provider automatically terminates the cellular service at the expiration of the customer's prepaid time.

A retail point of sale facilitates the purchase of cellular prepaid service with the sale of a prepaid card. A prepaid card identifies the service provider distributing the card, the amount of service associated with the prepaid card and the price of the prepaid card. The prepaid card further has an account number imprinted on the card uniquely identifying the prepaid card and may be read by the customer. The prepaid card may also have a personal identification number (PIN) viewable only after purchase of the card. Viewing the PIN may also require the purchaser opening a special compartment concealing the PIN or scratching off a secure coating over the PIN. The PIN may be included in the packaging as an item separate from the prepaid card.

The account number and amount of service associated with the card is also encoded in a machine readable format, such as a barcode or a magnetic strip on the card or its packaging. The amount of service may be encoded in the machine readable account number. This machine readable information facilitates easy activation of the card at the point of sale by a machine adapted to facilitate card activation.

The prepaid card provides information to facilitate the registration of the purchase by the customer. A customer dials the telephone of the service provider listed on the prepaid card, enters the account number, PIN and telephone number associated with the customer's wireless device. This information is typically entered by the customer through an interactive voice prompt (IVP) system provided by the wireless service provider. In response, the amount of prepaid service purchased is added to the customer's account.

Cellular service providers providing service in any given customer area are proliferating. Where an area was once covered by one or two service cellular providers in earlier days of cellular telephone service, the area may now be covered by six or more wireless service provider. Furthermore, as wireless services evolve the number of service providers may continue to increase. A problem arises when each wireless service provider markets its own prepaid card for the distribution of its prepaid wireless services. A point of sale becomes cluttered with a myriad of prepaid cards for multiple wireless service providers. The cluttered appearance of the retail space not only detracts from a desirable orderly appearance of merchant's facilities, but becomes a source of confusion for the customer attempting to purchase prepaid wireless service while visiting the merchant's point of sale.

Thus, what is needed is a prepaid wireless service distribution system that does not require a unique prepaid card for each wireless service provider. Furthermore, it is desirable to provide for this need without introducing additional complication to the customer registration process.

DETAILED DESCRIPTION OF THE INVENTION

Figure 1:
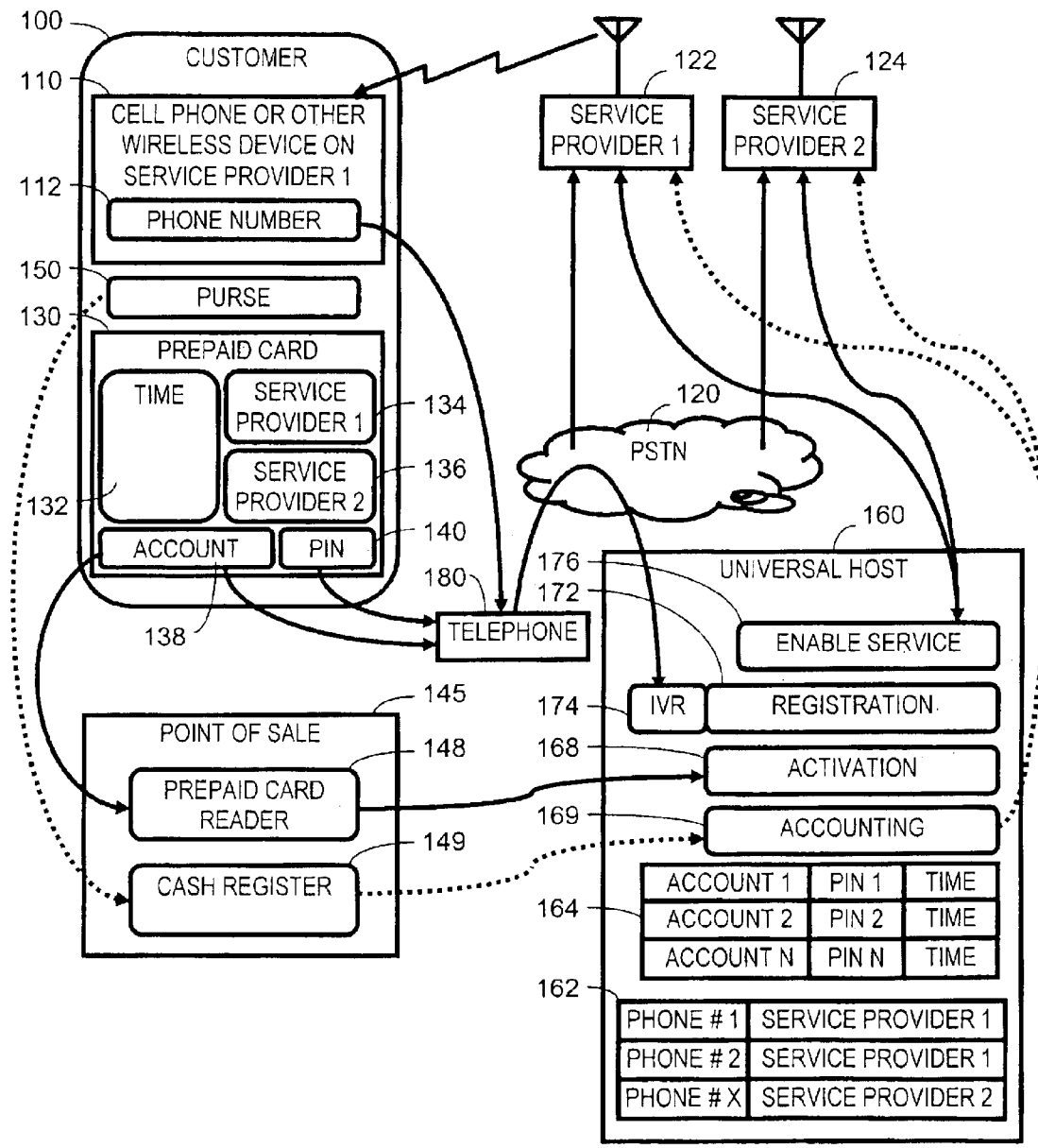
FIG. 1 shows a block diagram of a prepaid wireless communication system having multiple service providers operating in accordance with the present invention.

FIG. 1 shows a block diagram of a prepaid wireless communication system having multiple service providers operating in accordance with the present invention. A customer 100 is a user of a wireless device 110. The wireless device may be a cellular telephone having a telephone number 112 allowing conversations between the customer 100 and other associates through the public switch telephone network (PSTN) 120. The phone number 112 provides no obvious indication as to which service provider is providing wireless services to the customer. The PSTN has evolved to provide for conversations between persons having only a wired telephone connection. Service provider 122 provides a wireless connection between the PSTN and a multiplicity of wireless devices including customer device 110 thereby enabling wireless devices to also realize the benefit of PSTN communications. With the proliferation of wireless protocols and radio frequency spectrum licensing, numerous wireless protocols and wireless service providers may be provided in any given area. A second service provider 124 provides similar wireless services. Current wireless protocols include AMPS, IS-95, GSM, GPRS, CDMA-1, CDMA 2000, CDPD, and 3G to name a few and all provide for wireless connection between a wireless device and the PSTN via a wireless service provider. An array of service providers have also arisen to provide wireless services using the various protocols and include AT&T, Verison, Sprint, VoiceStream and Nextel, to name a few. Wireless device 110 preferably functions as a telephone, but may also function as a combination voice and data device or a data only device such as a wireless Palm Pilot or hybrid wireless telephone combined with a personal organizer or computer.

The wireless device 110 is a prepaid wireless service device receiving wireless services from the first service provider 122. The first service provider monitors the amount of service used by the wireless device 110 and terminates the service when the amount of service used substantially equals or exceeds the amount of prepaid service associated with the device. In order to obtain the wireless service, customer 100 has a prepaid wireless service card 130 that indicates an amount of time 132 of service associated with the card. The card preferably has a credit card form factor that is rectangular plastic and conveys various types of information. For example, a time on the card may indicate that the card provides for one hundred minutes of wireless services. The card also displays an array of marks or names of several service providers associated with the card including the first and second service providers, 134 and 136. Thus, the prepaid wireless service time 132 may be applied to any of the listed service providers 134–136. The prepaid card 130 also has an account number 138 and a personal identification number (PIN) 140 that serve to uniquely identify the prepaid card and deter theft or other improper transfers of the card and its corresponding prepaid service. The account number is preferably both readable by the purchaser as a printed number and readable by a machine as a magnetic stripe or barcode.

Prepaid card 130 is preferably purchased by customer 100 at a point of sale (POS) 145. The POS is preferably a retail outlet having a kiosk for displaying and distributing a multiplicity of prepaid cards. For example, a kiosk may be a display stand having hooks for dispensing prepaid cards set upon or close to a checkout counter. Example retail outlet types include grocery stores, discount stores, department stores and convenience stores. Note that the prepaid cards may also be branded with the mark of the retail outlet, thereby facilitating additional customer goodwill and loyalty. The POS also has a prepaid card reader 148 and a cash register 149. A barcode reader may be used to both read the price from the card in order to facilitate payment of the card and read a barcode having account number 138 in order to facilitate activation of the prepaid service. When the price of the purchase transaction is determined, consideration is transferred from the purse 150 (or equivalent) of the customer to the cash register 150. Consideration may be cash, check credit or other form of payment. In response, the wireless service time 132 uniquely associated with prepaid card 130 is activated. Prior to the exchange of consideration and activation, the card has no value, this deters theft or other improper transfer of the card and its corresponding services from the retail point of sale and distribution channels prior thereto.

Universal host 160 acts as an interface between multiple points of sale and multiple service providers in order to facilitate distribution of prepaid wireless services. The universal host 160 is preferably implemented on a computer based server coupled to the service providers, POS and PSTN through a telephonic connection such as a T1 line. The functions of the universal host are preferably implemented with in software operating the computer based server. The universal host is preferably operated by an experienced prepaid service distributor, such as DataWave® Systems Inc., which operates substantially independent of the POS business entities and the wireless service provider business entities. The universal host has access to a database 162 relating phone numbers of wireless devices to corresponding wireless service providers. This database facilitates the automatic selection of a service provider associated with a phone number and may be supplied by the various prepaid service providers 134–136 represented upon the prepaid card 130. Database 160 may alternately be maintained by an independent entity utilized used by the universal host. The universal host also has access to a database 164 relating prepaid card numbers of wireless PINs and times associated with corresponding prepaid card account numbers. This database facilitates enabling the prepaid services. In response to a purchase of a prepaid card, POS sends the universal host an activation signal including the account number of the prepaid card. The activation signal is processed by an activation processor 168. In response to activation, the POS retailer transfers compensation to an accounting processor 169 of the universal host. The universal host also has a registration processor 172 for registering the card and its prepaid services after activation. The registration processor preferably uses an interactive voice response (IVR) system 174 to facilitate registration. The universal host also has an enable service processor 176 that, in response to registration, communicates with the service providers to enable the prepaid service purchased from points of sale. In response to enabling a prepaid service, the accounting processor 169 transfers compensation to corresponding service provider.

A card and its corresponding prepaid service is registered by the customer 100 using a telephone 180 coupled to the IVR 174 through the PSTN 120. After activation at the POS, the customer registers the card and prepaid service by dialing a phone number of the universal host preferably listed on the prepaid card and entering the account number 138 and PIN 140 associated with the prepaid card 130 as well as phone number 112 of the wireless device 100. Entry of this information is facilitated by the IVR. Note that the customer need not decide how to select from the array of service providers 134–136 listed on the card. This selection is advantageously an automatic process performed by the universal host.

Figure 2:
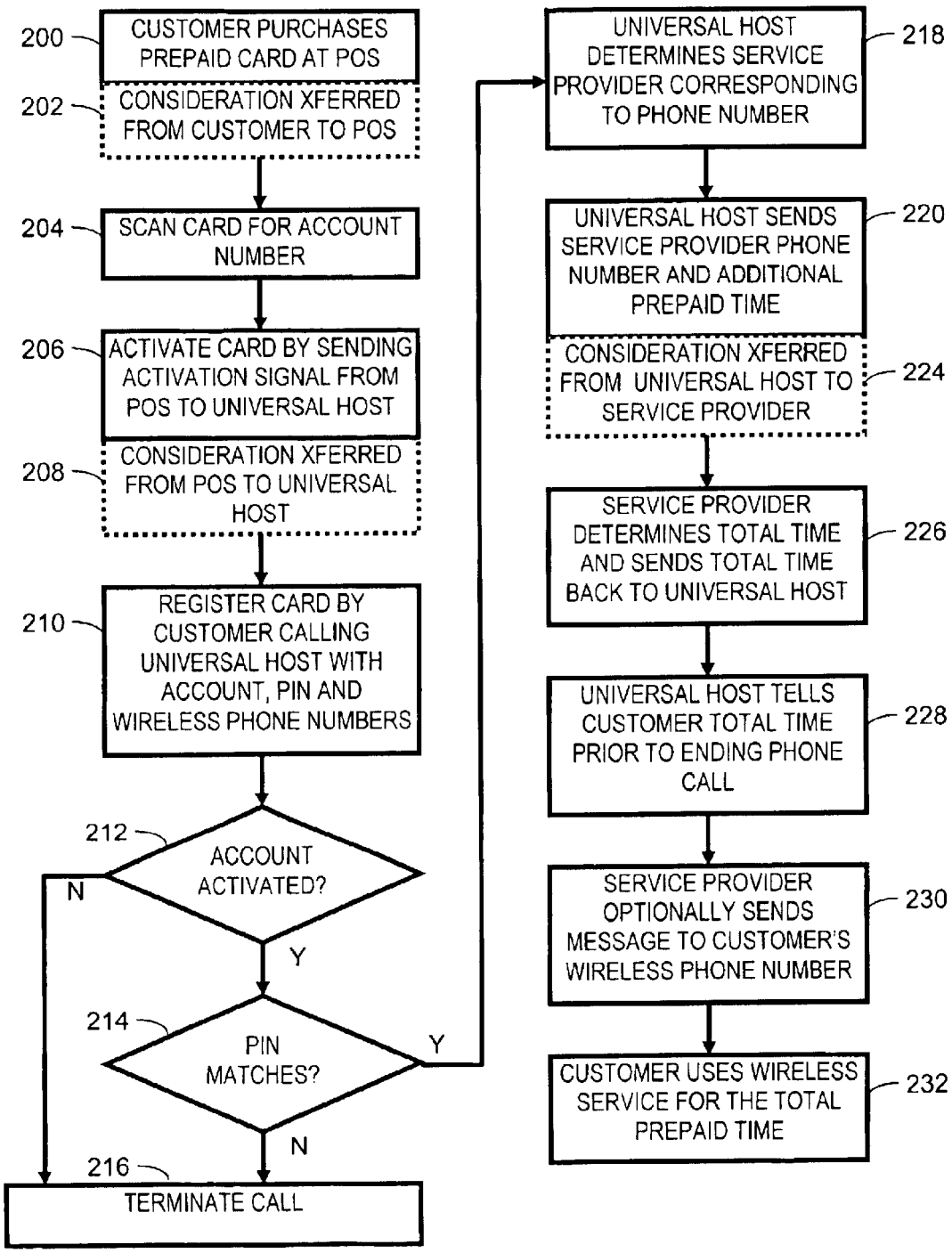
FIG. 2 shows a flow diagram of a process operating in accordance with the present invention.

FIG. 2 shows a flow diagram of a process operating in accordance with the present invention. At step 200 a customer purchases a prepaid card from a merchandiser at a POS. In response, consideration is transferred from the customer/buyer to the POS merchant/seller at step 202. In response to the purchase, the account number of the prepaid card is determined at the POS, step 204. This step preferably involves determining the account number using a machine readable method such as a barcode scan or a magnetic stripe swipe. The card is then activated by sending an activation signal, including the account number uniquely identifying the prepaid card, from the POS to the universal host at step 206. Consideration is due to be transferred from the merchant to the universal host in response to activation of the card at step 208. The customer then registers the card by calling the host from any available telephone using a universal host phone number included with the prepaid card. The customer then enters the account number and PIN associated with the card as well as the phone number of the customer's wireless device, step 210. This step is preferably accomplished by the customer entering data on a telephone's DTMF keypad and guided by voice prompts from an IVR system. In an alternate embodiment, the universal host can automatically read the phone number from the caller identification signal and determine if it corresponds to a prepaid wireless device. If the user confirms through the IVR system that the call originates from the prepaid wireless device intended to have the added services, then the caller identification signal is used and manual entry of the phone number can be eliminated. At step 212, the universal host then checks if the account has been activated by the POS at step 206. If not the call is terminated at step 216. This termination is likely due to a card being stolen or otherwise misappropriated from the POS, resulting in non-registration of the card and termination of the call. At step 214, the universal host then checks if the PIN corresponds to the PIN associated with the account using its database 164 of FIG. 1. If not, the call is terminated. This termination is likely due to a card being stolen or otherwise misappropriated from the customer prior to registration, resulting in non-registration of the card and termination of the call. Prior to termination the IVR provides the customer the opportunity to correct improper entries of information.

At step 218 and upon successful entry of account number, PIN and phone number information, the universal host determines which service provider corresponds to the phone number entered by the customer. The universal host uses database 162 of FIG. 1 equating phone numbers to corresponding service providers. Then as part of the registration process, the universal host automatically selects the appropriate service provider. This automatic step eliminates the requirement of the customer to determine and select the appropriate service provider. This also eliminates a problem of the customer to mistakenly selecting the wrong service provider, or a perception that the customer may use the registration process to somehow change from one service provider to another because the array of service providers represented on the prepaid card.

Upon automatic selection of one of the plurality service providers, the universal host sends the selected service provider the phone number of the wireless device and the additional prepaid service to be attributed to the wireless device at step 220. Corresponding consideration is transferred from the universal host to the service provider at step 224 in response to enabling the additional prepaid wireless service. The amount of additional prepaid service is determined from database 614 of FIG. 1 relating prepaid card account numbers with a predetermined amount of additional prepaid time. Alternatively, the prepaid time or service amount may be a variable determined at the POS and communicated from the POS to the universal host in the activation signal. Consideration transfers of steps 202, 208 and 224 would be adjusted accordingly. At step 226 the service provider adds the prepaid time to any pre-existing prepaid time associated with the phone number and returns the total to the universal host. The universal host then uses the IVR system to communicate the total amount of prepaid wireless service or time available to the customer prior to ending the call at step 228. At step 230, the service provider may optionally send a message to the customer's wireless device confirming the addition of the prepaid service. The message may be a data message displayed on a display of the wireless device or a voice message sent to the wireless device or it's associated voice mail. At step 232, the customer or user of the prepaid wireless device is then able to use the wireless device for the duration of the prepaid time or service to make or receive phone calls and/or to communicate data, exchange email, surf the Internet or utilize other wireless services provided by the wireless device and wireless service provider. Of course, the user may again purchase additional prepaid service by repeating the process beginning at step 200.

It will be appreciated by those familiar with the art that numerous modifications and adaptations to the described invention are possible while staying within the scope of the invention. For example, elements of the invention related to the PIN can be removed, no PIN associated with the prepaid card or required for registration. Also, the phone number can be modified to include any method of addressing device 110 that may also be utilized in connection with service provider identification, such as a URL or IP address. Alternately, the account number read by the point of sale may be manually read and manually entered at the point of sale. Also, other methods of machine readable account numbers are anticipated such as two dimensional bar codes or digital watermarks imprinted on the card. Also, the machine readable account number entered at activation need not be the same account number manually entered at registration. Yet still, the authorization and registration process may be combined where the phone number of the wireless device if entered at the point of sale using equipment provided at the point of sale. Furthermore, the preferred embodiment is couched in a wireless service application. Other types of applications are also anticipated including pure wire line, and combination wire line and wireless applications having a plurality of service providers.

The invention has the advantage of providing a universal prepaid wireless service card applicable to a plurality of service providers. A consumer of the service need not be required to correctly select their prepaid service card from a myriad of individual prepaid service provider cards offered at a POS kiosk. Alternate modes of transfer from a distributor to a possessor are also contemplated. For example, the distributor may sell or otherwise transfer the card to a third party individual and delivered to another, as a gift for example, without the requirement of knowing the identity of service provider of the receiver. Also, after being activated, the prepaid card has value and may be saved for later registration or otherwise transferred in a barter, exchange, sale or debt satisfaction prior to registration. The PIN associated with the card can be used to deter theft or other improper transfers prior to registration.

As another advantage, the invention reduces the cost of distribution of prepaid services provided by a plurality of service providers by eliminating the requirement and expense of a service provider establishing its own prepaid service distribution channel. The invention provides a common and secure distribution channel for all prepaid wireless service providers. Furthermore, individual service providers need not establish their own accounting, activation and authorization processes.

As another advantage, retailers need not display and maintain separate inventories of a myriad of prepaid cards for their customers. Rather a single prepaid card facilitates the sale of services to any of the prepaid wireless service providers. Furthermore, the prepaid card may be branded with the mark of a retailer, as well as the marks of the various service providers, thereby facilitating additional goodwill and customer loyalty for the retailer.

As another advantage, registration of the card by the buyer or customer is simplified because selection of the service provider from the array of service providers having marks displayed on the prepaid card is automatic. The registration process is substantially the same as if only the buyer's service provider were associated with the prepaid card. The customer cannot mistakenly select the wrong service provider during registration and cannot be lead to believe that the registration process can somehow be used to change wireless service providers.

According to the inventive principles as disclosed in connection with the preferred embodiment, the invention and the inventive principles are not limited to any particular kind of computer system but may be used with any general purpose computer, as would be known to one familiar with the art, arranged to perform the functions described and the method steps described. The operations of such a computer, as described above, may be according to a computer program contained on a medium for use in the operation or control of the computer, as would be known to one familiar with the art. The computer medium that may be used to hold or contain the computer program product, may be a fixture of the computer such as an embedded memory or may be on a transportable medium such as a disk, as would be known to one familiar with the art.

The invention is not limited to any particular computer program or logic or language, or instruction but may be practiced with any such suitable program, logic or language, or instructions as would be known to one familiar with the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although a specific embodiment of the invention has been disclosed. It will be understood by those familiar with the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

Thus, what is provided is a prepaid wireless service distribution system that does not require a unique prepaid card for each wireless service provider. Furthermore, this need is provided for without introducing additional complication into the customer registration process.

What is claimed is:

1. A method of providing prepaid communication services through a plurality of service providers comprising the steps of:

completing a sales transaction between a buyer and a seller at a point of sale, the sales transaction transferring limited rights to use any of a plurality service providers wherein selection thereof is not a condition of the sales transaction, the sales transaction also transferring a card having a unique account number to the buyer;

activating the sales transaction by communicating to a universal host the unique account number from the seller in response to the sales transaction;

registering the sales transaction by communicating from the buyer to the universal host the unique account number and a phone number of a communication device, wherein the phone number directs communication with the wireless communication device through a public switched telephone network and through a first of the plurality of service providers;

automatically selecting at the universal host the first service provider in response to the phone number; and enabling use of the limited rights by communicating an enabling signal from the universal host to the first service provider for enabling a predetermined amount of the communication services for the communication device wherein the card further includes a plurality of manually readable marks indicative of the plurality of service providers.

2. The method according to claim 1 wherein the buyer does not substantially participate in said step of activating and the seller does not substantially participate in said step of registering.

3. The method according to claim 1, wherein the plurality of service providers are wireless service providers and further comprising the steps of:

determining at the first of the plurality of wireless providers a total amount of wireless communication service available to the buyer;

communicating the total amount of wireless communication service from the first of the plurality of wireless providers to the universal host, wherein said step of registering the sales transaction is communicated between the buyer and the universal host through a telephone call using the public switched telephone network, and comprises the step of acknowledging registration of the limited rights by communicating the total amount of wireless communication service from the universal host to the buyer during the telephone call.

4. The method according to claim 1 wherein the universal host uses an interactive voice response system to communicate with the buyer during the telephone call.

5. The method according to claim 1, wherein the plurality of service providers are wireless service providers and further comprising the step of:

acknowledging said step of enabling use of the limited rights by communicating an acknowledgement signal from the first wireless service provider to the wireless communication device.

6. The method according to claim 1, wherein the plurality of service providers are wireless service providers and further comprising the steps of:

completing a second sales transaction between a second buyer and a second seller at a second point of sale, the second sales transaction transferring a second set of limited rights to use any of the plurality wireless service providers wherein selection thereof is not a condition of the second sales transaction, the second sales transaction also transferring a second card having a second unique account number to the second buyer;

activating the sales second transaction by communicating to the universal host the second unique account number from the second seller in response to the second sales transaction;

registering the second sales transaction by communicating from the second buyer to the universal host the second unique account number and a second phone number of a second wireless communication device, wherein the second phone number directs communication with the second wireless communication device through the public switched telephone network and through a second of the plurality of wireless service providers;

automatically selecting at the universal host the second wireless service provider in response to the phone number; and enabling use of the second set of limited rights by communicating a second enabling signal from the universal host to the second service provider for enabling a predetermined amount of the wireless communication services for the second wireless communication device.

7. A method of distributing wireless communication services through a plurality of service providers comprising the steps of:

receiving a first phone number indicative of a first wireless communication device wherein the first phone number directs communication with the first communication device through a public switched telephone network and through a first of the plurality of wireless service provider;

automatically selecting the first service provider from the plurality of service providers in response to the first phone number;

sending an enabling signal to the first service provider for enabling a predetermined amount of the communication services for the first wireless communication device;

receiving an activation signal indicative of completion of a remote sales transaction, the activation signal having an activated account number uniquely identifying the remote sates transaction, wherein said step of receiving the first phone number also receives a registration account number; and comparing the activated account number and the registration account number and generating an authorization signal in response to a match there between, and further wherein, and said step of sending is not performed in response to an absence of the authorization signal, wherein the remote sales transaction occurs at a point of sale and includes a transfer of a prepaid wireless service card wherein the card includes the activated account number for automatic reading by an automated device at the point of sale, a manually readable registration account number, and a manually readable symbol indicative of the predetermined amount of the wireless communication service.

8. The method according to claim 7 wherein the card further includes a plurality of manually readable marks indicative of the plurality of wireless service providers.

9. The method according to claim 7 further comprising the steps of:

receiving a second phone number indicative of a second wireless communication device wherein the second phone number directs communication with the device through the public switched telephone network and through a second of the plurality of wireless service providers;

automatically selecting the second wireless service provider from the plurality of wireless service providers in response to the second phone number; and sending a enabling signal to the second service wireless provider for enabling a predetermined amount of the wireless communication services for the second wireless communication device.

10. The method according to claim 7 further comprising the steps of:

receiving a second phone number indicative of a second wireless communication device wherein the second phone number directs communication with the device through the public switched telephone network and through a second of the plurality of wireless service providers;

automatically selecting the second wireless service provider in response to the second phone number;

sending a enabling signal to the second service wireless provider for enabling a predetermined amount of the wireless communication services for the second wireless communication device;

receiving a first activation signal indicative of completion of a first remote sales transaction, the first activation signal having a first activated account number uniquely identifying the first remote sales transaction;

receiving a second activation signal indicative of completion of a second remote sales transaction, the second activation signal having a second activated account number uniquely identifying the second remote sales transaction, wherein said step of receiving the first phone number also receives a first registration account number; and said step of receiving the second phone number also receives a second registration account number and comparing the first registration account number and the first and second activated account numbers and generating a first authorization signal in response to a first match between the first registration account number and the first activated account number, and further wherein, said step of sending the enabling signal to the first service provider is not performed in response to an absence of the first authorization signal, and comparing the second registration account number and the first and second activated account numbers and generating a second authorization signal in response to a second match between the second registration account number and the second activated account number, and further wherein, said step of sending the enabling signal to the second service provider is not performed in response to an absence of the second authorization signal.

11. The method according to claim 7, further comprising the step of:

determining a predetermined PIN in response to said step of receiving the activation signal wherein said step of receiving the first phone number also receives a registration PIN, and said step of comparing also compares the predetermined PIN with the registration PIN and generates the authorization signal further in response to a match there between.

12. The method according to claim 7 further comprising the step of:

receiving a total amount signal from the first wireless service provider indicative of a total amount of wireless communication service available to the first wireless communication device in response to said step of sending the enabling signal, wherein said step of receiving the first phone number receives the first phone number during a telephone call received through the public switched telephone network and further comprises the step of sending the total amount signal during the telephone call.

13. A system for providing prepaid wireless communication services through a plurality of wireless service providers comprising:

a prepaid card having an account number;

a universal host for receiving the account number and a phone number from a processor of the prepaid card, automatically selecting a first of the plurality wireless service providers in response to the phone number, and enabling limited use of the wireless communication services of the first wireless service provider for a wireless device corresponding to the phone number, wherein the prepaid card further includes a plurality of manually readable marks indicative of the plurality of wireless service providers.

14. The system according to claim 13 wherein said universal host further receives an activation signal having the account number from a distributor of the prepaid card in response to a transfer of the prepaid card from the distributor to a third party for ultimate possession by the possessor, said universal host does not enable the limited use of the wireless communication services of the first wireless service provider if the account number received from the possessor does not match the account number received from the distributor.

15. The system according to claim 13 wherein said prepaid card further includes a PIN, and said universal host further receives an activation signal having the account number from a distributor of the prepaid card in response to a transfer of the prepaid card from the distributor to the possessor, said universal host further receives the PIN from the possessor of the prepaid card and compares the PIN to a predetermined key associated with the account number, and said universal host does not enable the limited use of the wireless communication services of the first wireless service provider if the PIN does not match the predetermined key.

16. A system according to claim 13 further comprising a second prepaid card having a second account number; wherein said universal host receives the second account number and a second phone number from a possessor of the second prepaid card, selects a second of the plurality wireless service providers in response to the second phone number, and enables limited use of the wireless communication services of the second wireless service provider for a second wireless device corresponding to the second phone number in response to the second account number.

17. A computer readable program medium containing programming instructions for providing prepaid communication services through a plurality of service providers, the programming instructions comprising:

completing a sales transaction between a buyer and a seller at a point of sale, the sales transaction transferring limited rights to use any of a plurality of service providers wherein selection thereof is riot a condition of the sales transaction, the sales transaction also transferring a card having a unique account number to the buyer;

activating the sales transaction by communicating to a universal host the unique account number from the seller in response to the sales transaction;

registering the sales transaction by communicating from the buyer to the universal host the unique account number and a phone number of a communication device, wherein the phone number directs communication with the wireless communication device through a public switched telephone network and through a first of the plurality of service providers;

automatically selecting at the universal host the first service provider in response to the phone number; and enabling use of the limited rights by communicating an enabling signal from the universal host to the first service provider for enabling a predetermined amount of the communication services for the communication device, wherein the card further includes a plurality of manually readable marks indicative of the plurality of service providers.

* * * * *

UNITED STATES PATENT AND TRADEMARK OFFICE
CERTIFICATE OF CORRECTION

PATENT NO.   : 6,745,022 B2
DATED        : June 1, 2004
INVENTOR(S)  : David Knox It is certified that error appears in the above-identified patent and that said Letters Patent is hereby corrected as shown below:

Column 6,
Line 25, change "possessor" to -- processor --

Column 11,
Lines 17, 21, 28, 30, and 41, change "possessor" to -- processor --

Signed and Sealed this

Twenty-seventh Day of July, 2004

JON W. DUDAS
*Acting Director of the United States Patent and Trademark Office*